(12) United States Patent
Kamiyama et al.

(10) Patent No.: US 7,803,245 B2
(45) Date of Patent: Sep. 28, 2010

(54) PIPELINE LINING METHOD

(75) Inventors: Takao Kamiyama, Hiratsuka (JP); Koji Kaneta, Hiratsuka (JP); Kenji Fujii, Hiratsuka (JP)

(73) Assignee: Shonan Gosei-Jushi Seisakusho K.K. (JP)

( * ) Notice: Subject to any disclaimer, the term of this patent is extended or adjusted under 35 U.S.C. 154(b) by 595 days.

(21) Appl. No.: 11/667,178

(22) PCT Filed: Oct. 28, 2005

(86) PCT No.: PCT/JP2005/019860
§ 371 (c)(1),
(2), (4) Date: May 29, 2007

(87) PCT Pub. No.: WO2006/049089
PCT Pub. Date: May 11, 2006

(65) Prior Publication Data
US 2008/0095932 A1    Apr. 24, 2008

(30) Foreign Application Priority Data
Nov. 5, 2004 (JP) ............................. 2004-321426
Mar. 18, 2005 (JP) ............................. 2005-078333

(51) Int. Cl.
B29C 73/00 (2006.01)
B29C 65/00 (2006.01)
B32B 43/00 (2006.01)
B32B 37/00 (2006.01)
C09J 5/02 (2006.01)
F16L 55/16 (2006.01)

(52) U.S. Cl. ............... 156/294; 156/94; 156/307.3; 156/287; 138/98; 264/36.16

(58) Field of Classification Search ........ 156/71, 156/83, 94, 285, 287, 293, 294, 307.1, 307.3; 427/140, 230, 236, 237, 238; 118/300, 313, 118/315, 317; 138/97, 98; 264/36.16, 36.17; 239/543, 544, 545, 547
See application file for complete search history.

(56) References Cited

U.S. PATENT DOCUMENTS

| 3,096,819 | A | * | 7/1963 | White, Jr. et al. ......... 166/309 |
| 4,350,548 | A | * | 9/1982 | Zenbayashi et al. ....... 156/156 |
| 4,361,451 | A | * | 11/1982 | Renaud ..................... 156/64 |
| 4,786,525 | A | * | 11/1988 | Kayser et al. ............. 427/236 |
| 5,092,265 | A | * | 3/1992 | Hughes et al. ............ 118/317 |
| 5,334,429 | A | * | 8/1994 | Imoto et al. .............. 428/36.2 |
| 2003/0161946 | A1 | * | 8/2003 | Moore et al. ............. 427/236 |

FOREIGN PATENT DOCUMENTS

| JP | 56082216 A | * | 7/1981 |
| JP | 02196627 A | * | 8/1990 |
| JP | 08-127068  | * | 5/1996 |
| JP | 08127068 A | * | 5/1996 |

* cited by examiner

Primary Examiner—Richard Crispino
Assistant Examiner—Brian R Slawski
(74) Attorney, Agent, or Firm—Adams & Wilks

(57) ABSTRACT

In a pipeline lining method, a tubular lining material impregnated with a thermosetting resin is inserted in an everted state into a pipeline and expanded and pressed against an inner peripheral surface of the pipeline. A vapor mist and water at normal temperature are sprayed toward the tubular lining material and mixed together to cool the vapor mist. The cooled vapor mist is directed onto the tubular lining material to cure the thermosetting resin impregnated in the tubular lining material to line the pipeline with the tubular lining material.

24 Claims, 10 Drawing Sheets

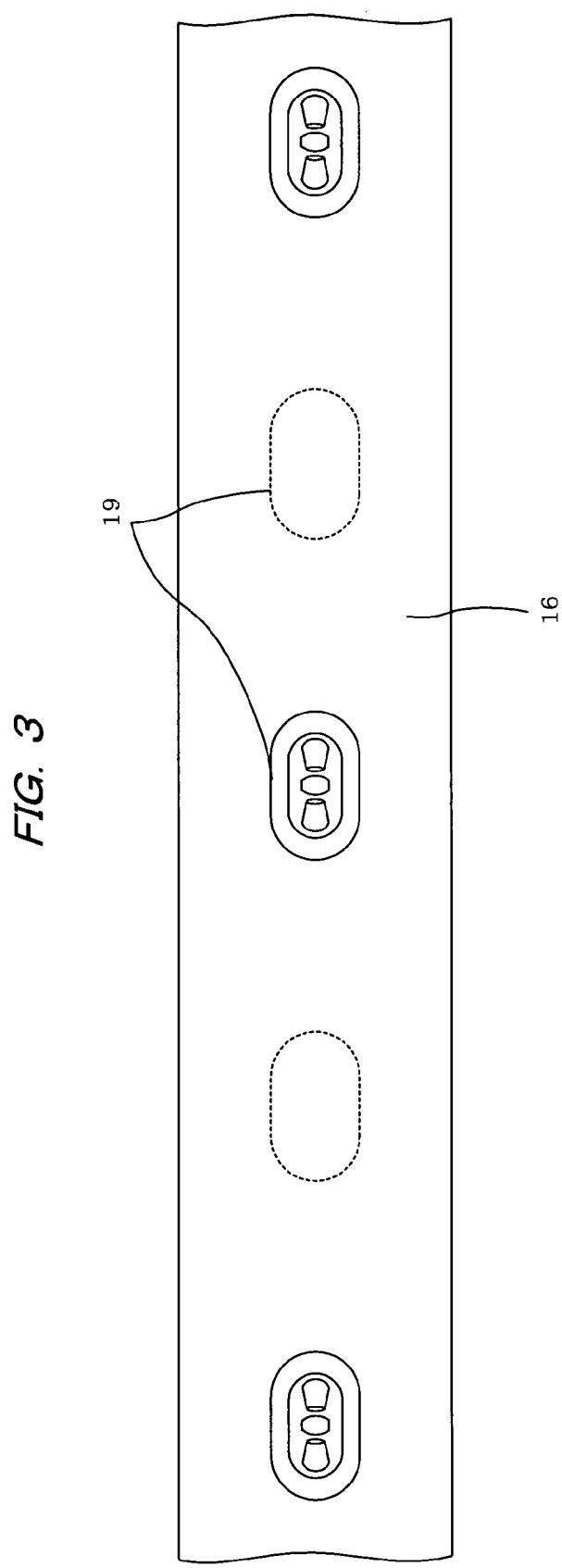

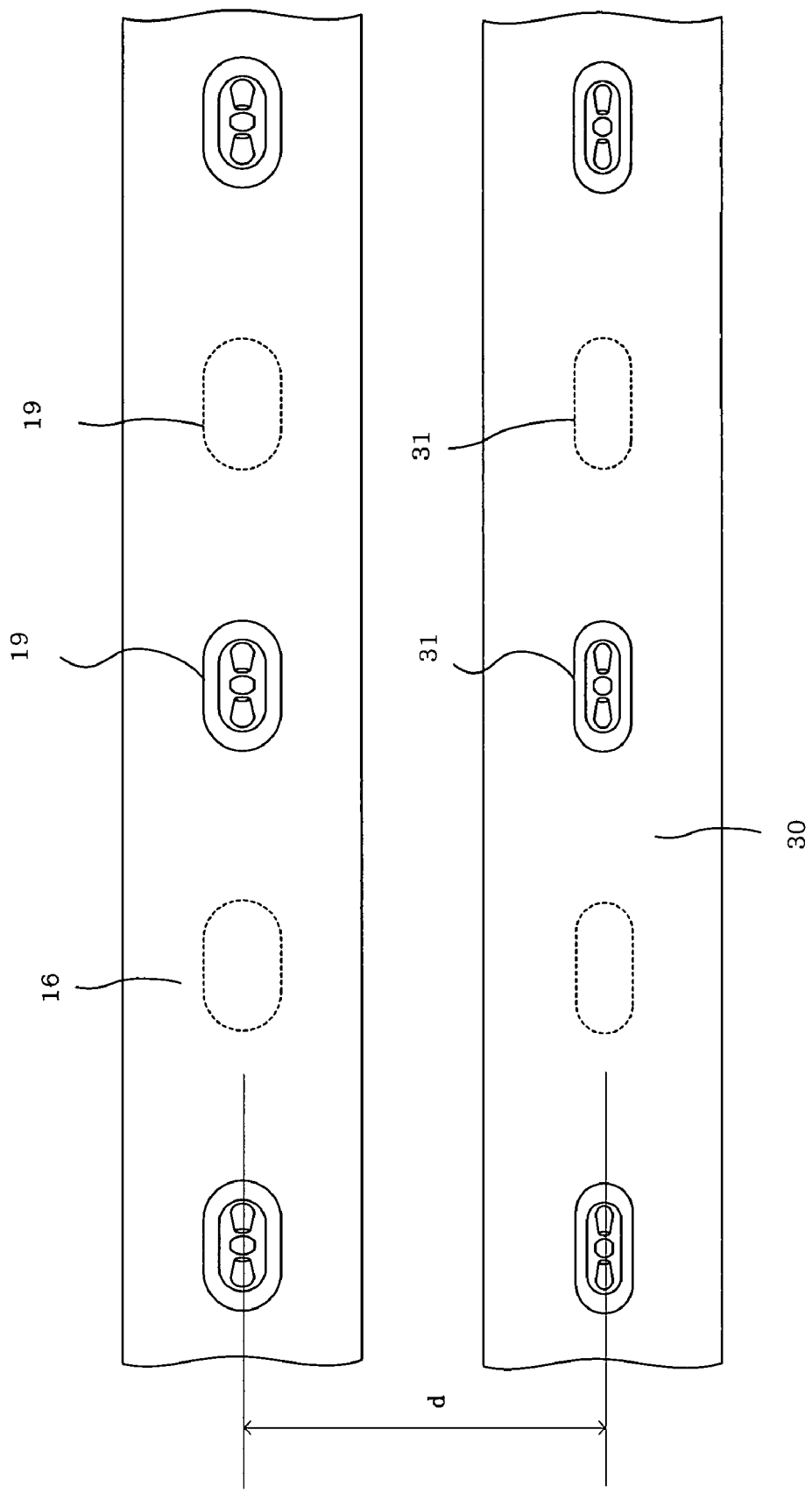

PIPELINE LINING METHOD

CROSS-REFERENCE TO RELATED APPLICATIONS

This application is a U.S. national stage application of International Application No. PCT/JP2005/019860, filed Oct. 28, 2005, claiming an earliest priority date of Nov. 5, 2004, and published in a non-English language.

BACKGROUND OF THE INVENTION

1. Technical Field

The present invention relates to a pipeline lining method for lining a pipeline in order to repair an aging pipeline.

2. Background Art

In order to repair an aged sewer pipe or other pipeline buried under ground using already proposed pipeline lining methods without removing the pipe from the ground, a tubular lining material impregnated with a thermosetting resin is inserted into the pipeline, the lining material is heated while being expanded by air pressure or the like and pressed against an inner peripheral surface of the pipeline, and the thermosetting resin impregnated in the lining material is cured to line the pipeline. A method using vapor (water vapor) or a method using a hot water shower is used for heating the lining material.

When vapor is used in order to cure the lining material, high-temperature vapor is sprayed in a length direction of the pipe from one end part of the lining material that is inserted into the pipeline and pressed against the inner peripheral surface of the pipe to the inside of the lining material. The vapor fills the lining material, and heat from the vapor heats and cures the lining material.

On the other hand, a method is known from, e.g., Japanese Patent No. 2501048 in which curing is achieved by a hot water shower. In such a method, a hot water hose in which a plurality of spray openings for spraying hot water is formed at predetermined intervals in a length direction, is inserted into the pipeline along with the lining material. The lining material is expanded by air pressure, and high-temperature hot water is pressurized and supplied to the hot water hose while the lining material is pressed against the inner peripheral surface of the pipe. This causes hot water to be sprayed as a hot water shower from the spray openings of the hot water hose and blown against the inner peripheral surface of the lining material, thus heating and curing the lining material.

However, in a thermal curing method that uses vapor, the temperature decreases, the vapor condenses into water droplets and the amount of drippage thereof increases, as the sprayed vapor travels away from a nozzle. Therefore, drawbacks are presented in that the vapor is sparse in the vicinity of an end part of the lining material on the side opposite the nozzle, heat is insufficient, the thermosetting resin of the lining material is not readily cured, and the time required for the resin to cure increases. A problem is also presented in that uniform heating cannot be achieved in the length direction of the lining material. In order to address such problems, the amount of vapor sprayed from the nozzle must be increased, and a large amount of power must be provided for a heater or boiler for generating the vapor.

Problems related to poor efficiency are accordingly presented, and additional costs associated with fuel and the like are incurred.

As the pressure in the pipe increases, the temperature of the vapor also increases. Under normal pressure within the pipe, the temperature of the vapor increases from 150° C. to 170° C. For this reason, a problem is presented in that the characteristics of the resin of the lining material will be adversely affected.

On the other hand, in a method using a hot water shower, the hot water of the hot water shower sprayed as a shower against the inner peripheral surface of the lining material is ejected in a point-like profile, and does not spread. Therefore, problems are presented in that the lining material is not readily heated in a planar and uniform fashion and that the time required to cure the resin increases. For example, 20 to 100 spray openings for the hot water holes must be provided for every meter of hose in order to heat the lining material in as planar and uniform a fashion as possible. When the number of spray holes is increased, the amount of hot water consumed increases, efficiency is poor, and costs are incurred.

SUMMARY OF THE INVENTION

Therefore, it is an object of the present invention to provide a pipeline lining method of the above-described type wherein the lining material can be heated uniformly, favorable efficiency is achieved, costs are low, and the pipeline can be repaired and renewed quickly and at a favorable quality.

In order achieve the foregoing object, the present invention provides a pipeline lining method, characterized in that a tubular lining material impregnated with a thermosetting resin is inserted in an everted state into a pipeline and expanded and pressed against an inner peripheral surface thereof, vapor mist is sprayed, and the sprayed vapor mist is cooled and blown onto the lining material to cure the thermosetting resin impregnated in the lining material in order to line the pipeline.

The present invention also provides a pipeline lining method, characterized in that a tubular lining material impregnated with a thermosetting resin is inserted in an everted state into a pipeline and expanded and pressed against an inner peripheral surface thereof, vapor mist and normal-temperature water are sprayed so as to mix with one another, and the vapor mist cooled due to the mixing is blown onto the lining material to cure the thermosetting resin impregnated in the lining material in order to line the pipeline.

According to the pipeline lining method of the present invention, vapor mist is generated, the vapor mist is cooled by blowing normal-temperature water into the vapor mist or by mixing the vapor mist with normal-temperature water, and the cooled vapor mist is blown against the inner surface of the lining material. This enables the thermosetting resin impregnated in the lining material to be thermally cured. Therefore, the lining material can be uniformly heated, heating efficiency is thereby improved, and the resin can be cured about 30% faster due to this improvement in heating efficiency. Cooling the vapor mist enables the temperature for curing the lining material to be prevented from being excessively high, and enables the quality of the lined pipeline to be improved.

BRIEF DESCRIPTION OF DRAWINGS

FIG. 3 is an enlarged top view of a vapor tube 16 in FIG. 1;

FIG. 4b is a cross-sectional view along a B-B line in FIG. 4a;

FIG. 6 is an enlarged top view of the vapor tube and a coolant tube corresponding to FIG. 3 in the embodiment in which the lining material is heated by the cooled vapor mist;

FIG. 7b is a cross-sectional view along a B-B line of FIG. 7a;

FIG. 9b is a cross-sectional view along a B-B line in FIG. 9a; and

KEY TO SYMBOLS

Figure 1:
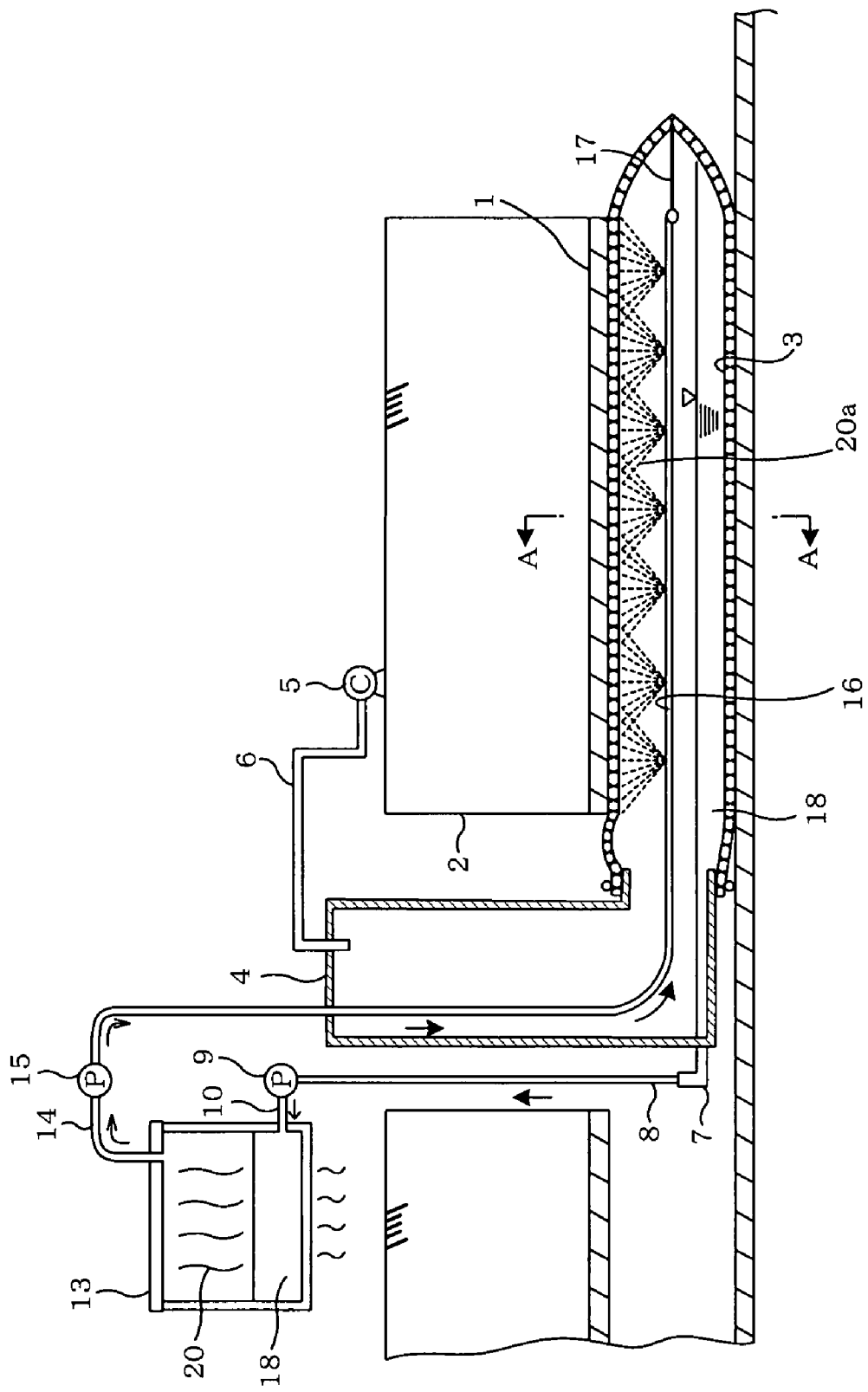
FIG. 1 is a cross-sectional view showing a pipeline lining method of an embodiment of the present invention.

1 Pipeline
2 Manhole
3 Lining material
4 Pressure container
5 Air compressor
9 Hot water pump
13 Vapor tank
15 Vapor pump
16 Vapor tube
18 Hot water
19 Sprayer
19b Diffusing member
19c Nozzle
20 Vapor
20a Vapor mist
30 Coolant tube
31 Sprayer
40 Water tank

DETAILED DESCRIPTION OF THE PREFERRED EMBODIMENTS

Embodiments of the present invention will be described below with reference to the accompanying drawings.

Embodiments are shown in which, in a pipeline lining method, hot water mist, vapor mist, or cooled vapor mist is blown against a lining material to thereby heat the lining material and cure the thermosetting resin therein.

Embodiment 1

FIG. 1 is a cross-sectional view showing a pipeline lining method of an embodiment. Reference symbol 1 indicates a sewer pipe or another aging pipeline buried under ground. In a pipeline lining process for repairing the pipeline, compressed air or another compressed medium is caused to act on an airtight pressure container 4 from an air compressor 5, whereby a flexible tubular lining material 3 is turned inside out and inserted in an everted state into the pipeline 1.

The lining material 3 is a non-woven fabric composed of polyester, vinylon, acrylic, or another fiber that is sewn into a tubular shape and covered at one surface (a surface that is the exterior surface before being inserted in an everted state into the pipeline 1) with a highly airtight film, and is formed as a flexible tubular resin-absorbing material impregnated with unsaturated polyester resin, vinyl ester resin, epoxy resin, or another thermosetting resin. A distal end part of the lining material 3 is closed and a rear end part is open. The rear end part is coupled in airtight fashion to an open part formed on one side of a lower end part of the pressure container 4 disposed in a manhole 2.

The air compressor 5 is connected to the pressure container 4 via a pipe 6. A water discharge pipe 7 is provided to a lower part of the pressure container 4. A hot water hose 8 connected to a hot water pump 9 disposed above ground is connected to the water discharge pipe 7. The hot water pump 9 is connected to a lower part of a vapor tank 13 via a pipe 10 and supplies hot water 18 to the vapor tank 13. The vapor tank 13 is heated by a heater (not shown), the hot water 18 contained therein is brought to a boil, and vapor (water vapor) 20 is generated. A vapor pump 15 is connected to an upper part of the vapor tank 13 via a pipe 14. A vapor tube (vapor hose) 16 is connected to the vapor pump 15.

A distal end part of the vapor tube 16 is coupled to a distal end part of the lining material 3 by a rope 17. The vapor tube is inserted into the pipeline 1 in conjunction with the eversion and insertion of the lining material 3. The portions of the pressure container 4 into which the compressor pipe 6, water discharge pipe 7, and vapor tube 16 are inserted are kept airtight by a gasket (not shown), and the pressure container 4 has a structure that is airtight overall.

A plurality of sprayers 19 is provided as spraying means in a longitudinal direction of the vapor tube 16, as shown in the top view of the vapor tube 16 in FIG. 3. Vapor mist 20a is sprayed from the sprayer 19. In the present invention, a mixture of vapor with a plurality of mist-form small hot water drops (mist) obtained by the vapor condensing shall be referred to as "vapor mist."

The sprayers 19 may, as a minimum, be provided only to an upper side of the vapor tube 16 as shown by a solid line in FIG. 3. However, sprayers may also be provided to a lower side as shown by the broken line, and may further be provided to left and right sides.

Figure 4A:
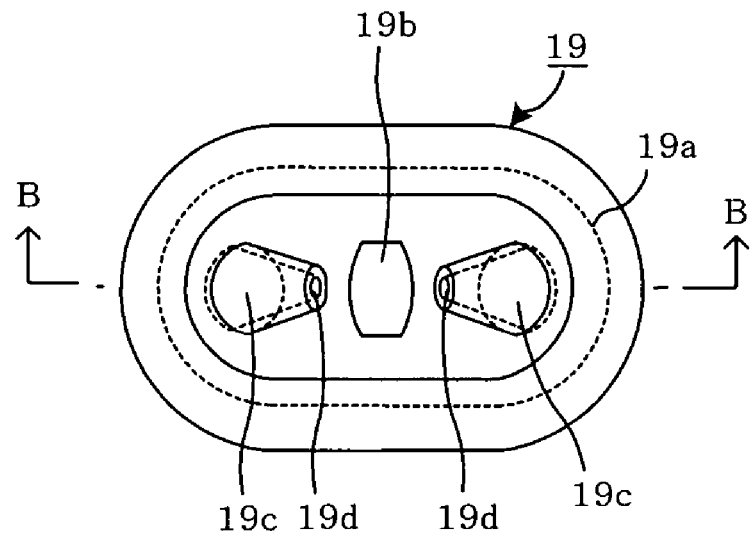
FIG. 4a is a top view showing a structure for a sprayer 19 in FIG. 3.
Figure 4B:
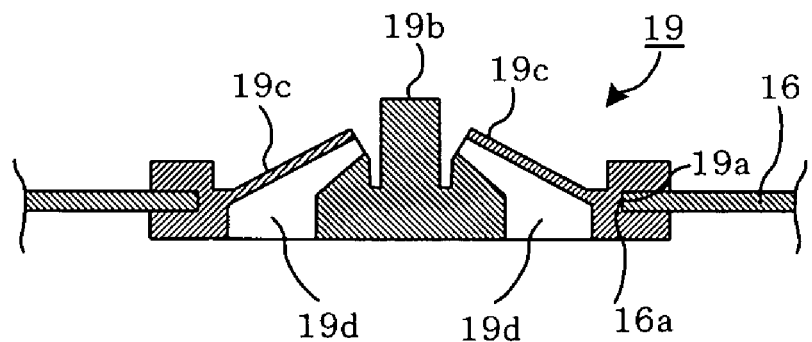

The structure of the sprayers 19 is as shown in FIGS. 4a and 4b. The sprayer 19 is made from plastic and is formed into an oval shape. A groove 19a is formed across an entire outer periphery of the sprayer. Meanwhile, an oval-shaped hole 16a that corresponds to the dimensions of the oval shape of the groove 19a is formed on the vapor tube 16.

A peripheral edge part of the hole 16a of the vapor tube 16 is sandwiched in the groove 19a, the sprayer 19 fits into the hole 16a, and the peripheral edge part of the hole 16a is attached or bonded to the groove 19a, whereby the sprayer 19 is mounted on the vapor tube 16.

A diffusing member 19b, which is a protuberance having a barrel-shaped cross section, is formed at a center on an upper surface of the sprayer 19. Two tilted hollow nozzles 19c having circular truncated cone shapes are provided at positions facing one another. These hollow nozzles 19c sandwich the diffusing member disposed therebetween. Both side surfaces of the diffusing member 19b that face the nozzles 19c are formed into the curved shape of the barrel shape. Holes 19d of the nozzles 19c penetrate from a distal end of the nozzles 19c to a lower surface of the sprayer 19 and are in communication with the inside of the vapor tube 16.

In such a configuration, when the pipeline 1 is to be repaired, the non-everted lining material 3 is accommodated in the pressure container 4, the open end of the lining material is mounted in airtight fashion on the open part at a lower end of the pressure container 4, and the pressure container 4 is inserted into the manhole 2, as shown in FIG. 1. Compressed air or another compressed medium is then enacted upon the pressure container 4 from the air compressor 5, whereby the lining material 3 is tuned inside out and inserted in an everted state into the pipeline 1.

Before the everted and inserted lining material 3 is heated and cured, air pressure is applied via the air compressor 5 to expand the lining material and press it against an inner peripheral surface of the pipeline 1. In this state, a heater (not shown) for heating the vapor tank 13 is driven, and the vapor 20 is generated. The vapor pump 15 is then driven, and the vapor 20 is pressurized and supplied to the vapor tube 16.

Figure 2:
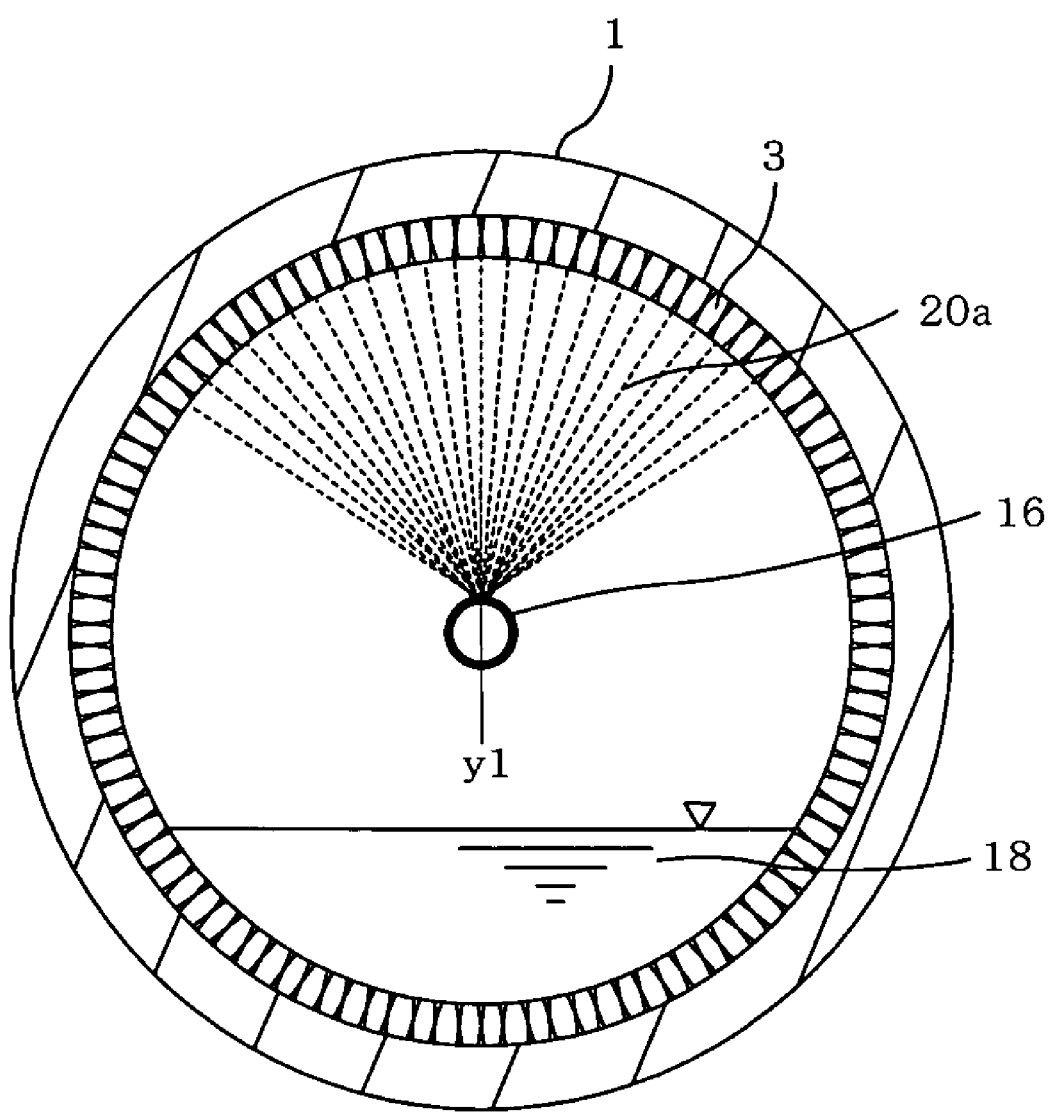
FIG. 2 is a cross-sectional view along an A-A line of an arrow in FIG. 1.

Accordingly, in the sprayer 19 shown in FIGS. 4a and 4b, the pressurized vapor from inside the vapor tube 16 and a small amount of hot water resulting from the condensation of some of the vapor partway along the vapor tube 16 are passed through the holes 19d and sprayed from the distal ends of the nozzles 19c. The vapor and hot water strike the diffusing member 19b rebound, and are then diffused and sprayed as vapor mist 20a as shown in FIGS. 1 and 2. Therefore, the vapor mist can be generated by using the sprayer provided with the diffusing member to diffuse the vapor via the diffusing member and then spray the vapor in a misted form.

As described above, the diffusion surfaces that are on both sides of the diffusing member 19b and face the nozzles 19c are formed into curved shapes, whereby the vapor mist 20a can be spread over a wider range. The vapor mist 20a is uniformly diffused in four directions centered about a perpendicular direction y1 in which the vapor mist 20a is sprayed from the vapor tube 16 toward the lining material 3, as shown in FIG. 2.

Thus, the vapor mist is diffused and sprayed in a misted form in four directions from each of the sprayers 19, and blown against the inner peripheral surface of the lining material 3, thereby heating the lining material 3. The vapor mist 20a decreases in temperature and condenses into large water drops. The vapor mist is transmitted to the inner peripheral surface of the lining material 3, drips down, and collects as the hot water 18 at a bottom part of the lining material 3 and pressure container 4. The hot water 18 is passed from the water discharge pipe 7 through the hot water hose 8, the hot water pump 9, and the pipe 10 by the driving of the hot water pump 9, is returned to the vapor tank 13, is once again heated to become the vapor 20, and is used to heat the lining material 3.

Such circulation enables the vapor mist 20a to be blown continually to heat the lining material 3, and enables the thermosetting resin impregnated therein to be cured to line the pipeline 1. Once curing is complete, the heating of the vapor tank 13 and the driving of the pumps 9, 15 are stopped. Both end parts of the lining material 3 are then cut, the pressure container 4 and vapor tube 16 are removed, and other operations are performed to complete the lining process.

According to the above-described pipeline lining method of the present embodiment, the vapor mist 20a is blown against the lining material 3, and the lining material 3 is therefore uniformly heated in a planar form by the highly diffused vapor mist 20a. The width to which the vapor mist 20a is diffused can be made to be, e.g., about one meter. Therefore, the distance between the sprayers 19 in the length direction of the vapor tube 16 is set to, e.g., 20 to 80 cm, the sprayers are provided at intervals shorter than the width to which the vapor mist 20a is spread in the length direction of the lining material 3, and the lining material 3 can be uniformly heated in the length direction as long as the vapor mist 20a is blown against the lining material.

In FIGS. 1 and 2, in order to simplify the drawings, an instance is shown in which the vapor mist 20a is only sprayed at an upper side, i.e., the sprayers 19 are provided only to a top of the vapor tube 16. However, additionally providing the sprayers to the lower and left and right sides enables the vapor mist 20a to be blown uniformly across the peripheral direction of the lining material 3 and enables uniform heating.

In the present embodiment, the lining material 3 can thus be uniformly heated in planar fashion in the length direction. Therefore, the lining material can be heated and cured efficiently and at a low cost.

Embodiment 2

In the above-described embodiment, vapor mist was blown against the lining material. However, hot water mist (a plurality of small hot water drops in a misted form) may also be blown against the lining material. In this instance, the vapor tube 16 provided with the sprayers 19 is a hot water tube for circulating hot water, the vapor tank 13 is substituted with a hot water tank, and the vapor pump 15 is substituted with a hot water pump. Driving the hot water pump pressurizes the hot water in the hot water tank and supplies the hot water to the hot water tube.

Accordingly, in the sprayer 19 shown in FIG. 4, the pressurized hot water passes from the hot water tube through the holes 19d, and is sprayed from distal ends of the nozzles 19c. The hot water then strikes the diffusing member 19b, and rebounds to be diffused and sprayed as hot water mist. Therefore, the hot water mist can be generated by using the sprayer provided with the diffusing member to diffuse the hot water using the diffusing member and then spray the hot water in a misted form.

As when vapor mist is used, both side surfaces of the diffusing member 19b that face the nozzles 19c are formed into a curved shape, whereby the hot water mist can be spread over a wider range.

Thus, the hot water is diffused and sprayed in a misted form from the sprayers 19, and is blown against the inner peripheral surface of the lining material 3, thereby heating the lining material 3. In addition, when hot water mist is used, the lining material 3 can be uniformly heated in planar fashion in the length direction, and can be heated efficiently and at a low cost in the same manner as when vapor mist is used.

As described above, in the method of the prior art that uses a hot water shower, 20 to 100 spray openings must be formed for every meter of the hot water hose. However, in the method using hot water mist, the hot water mist is uniformly blown against the inner peripheral surface of the lining material 3 so that uniform heating can be achieved and heating can be performed efficiently as long as 4 to 12 sprayers 19 are provided for every meter of the hot water tube.

Embodiment 3

In Embodiment 1, vapor mist was blown against the lining material. However, the vapor mist has a high temperature. When the vapor mist is blown directly against the lining material, there is a risk that the characteristics of the lining material will deteriorate. Therefore, it is preferable to cool the vapor mist so that the temperature of the vapor mist blown against the lining material will be tailored for the curing characteristics of the lining material.

Figure 5:
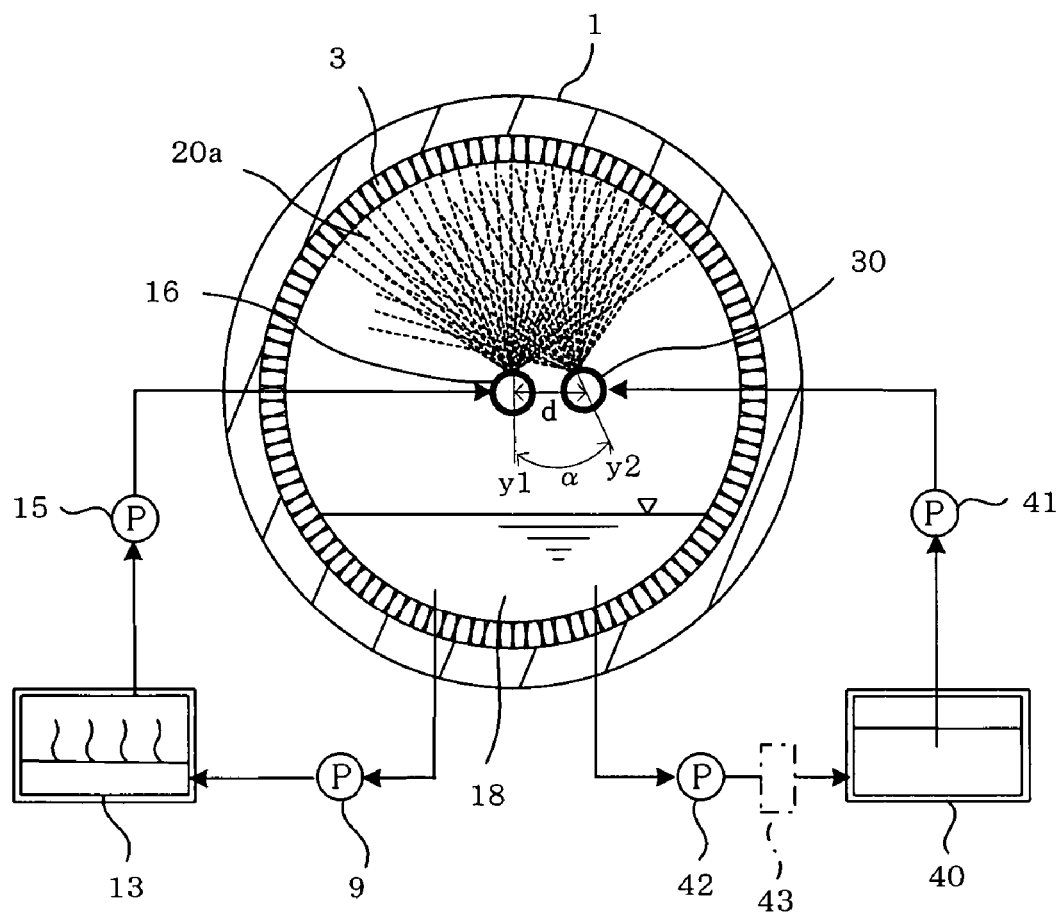
FIG. 5 is a cross-sectional view corresponding to FIG. 2 of an embodiment in which a lining material is heated by a cooled vapor mist.

An embodiment for that purpose is shown in FIGS. 5 and 6. In this embodiment, a coolant tube 30 and the vapor tube 16 are disposed side by side, and a distal end part of the coolant tube 30 is coupled to a distal end part of the lining material 3 by a rope 17 in the same manner as the vapor tube 16. The coolant tube 30 is thereby inserted into the pipeline 1 along with the vapor tube 16 in association with the eversion and insertion of the lining material 3.

A plurality of sprayers 31 is disposed on an upper side of the coolant tube 30 at the same positions in the length direction of the tube as the sprayers 19 and at the same intervals as the sprayers 19. The sprayers 31 have the same configuration and function as the sprayers 19 shown in FIGS. 4a and 4b. The sprayers 31 comprise two nozzles (corresponding to the nozzles 19c) for spraying normal-temperature water supplied from the coolant tube 30, and a diffusing member (corresponding to the diffusing member 19b), which is disposed between the nozzles, for deflecting the normal-temperature water sprayed from the nozzles and diffusing it as small water drops. As used herein, the term "normal-temperature water" refers to, e.g., tap water or other similarly obtained water that has been neither heated nor cooled.

Sprayers 31 can also be provided to the lower side and left and right sides in addition to the upper side in the same manner as on the vapor tube 16. A sprayer provided to the lower side is shown by a dotted line in FIG. 6.

The coolant tube 30 is disposed apart from the vapor tube 16 at a distance d in the horizontal direction, as shown in FIG. 5. The sprayers 31 provided to the coolant tube 30 are disposed so that a direction y2 in which the normal-temperature water is sprayed toward the lining material 3 is inclined at an angle α from the direction y1 (perpendicular direction) in which the vapor mist is sprayed from the vapor tube 16 toward the lining material 3, and so that the lines y1 and y2 intersect substantially at the inner surface of the lining material 3. Thus, the spraying direction y2 for the normal-temperature water from the sprayers 31 is inclined from the spraying direction y1 for the vapor mist from the sprayers 19 of the vapor tube 16. This enables the vapor mist to be uniformly cooled by the water sprayed from the sprayers 31.

A water tank 40 is provided in order to supply the normal-temperature water to the coolant tube 30, and normal-temperature water drawn by a pump 41 is supplied to the coolant tube 30, as shown in FIG. 5. The vapor mist 20a and normal-temperature water sprayed from the sprayers 19 and 31 mix and collect below the lining material 3 as the hot water 18. Therefore, the water can be returned to the water tank 40 by a pump 42, replenishing the consumed water. The temperature of the water in the water tank 40 is increased because the hot water 18 will be circulated. If the temperature does not decrease to, e.g., a temperature of 15 to 20 degrees or less, through natural cooling, the water tank 40 is cooled by air or water, or the hot water is cooled using a cooling device 43 and caused to return into the water tank 40. A radiator structure (e.g., chiller) comprising a radiating fin may be used for the cooling device 43, and cooling may be performed using air, water, or oil. Alternatively, a configuration may be adopted in which, instead of the hot water 18 being refluxed, tap water (not shown) is supplied to the water tank 40 and normal-temperature water is supplied to the coolant tube 30.

In such a configuration, when the lining material 3 is inserted in an everted state into the pipeline 1, the vapor tube 16 and coolant tube 30 are inserted into the everted lining material 3 in conjunction with the eversion and insertion. In this instance, in order to have the tubes be inserted while maintaining the distance d, the tubes are connected via connecting implements. When the pipeline 1 having a predetermined length is lined using the lining material 3 as shown in FIG. 1, the vapor from the vapor tank 13 is supplied to the vapor tube 16 while the lining material 3 is expanded and pressed against the inner peripheral surface of the pipeline, whereby vapor mist is sprayed from the sprayers 19. Normal-temperature water is also supplied from the water tank 40 to the coolant tube 30, and the normal-temperature water is sprayed from the sprayers 31.

The spraying direction y2 for the water from the coolant tube is inclined at the angle α from the spraying direction y1 for the vapor mist from the vapor tube, as shown in FIG. 5, and lines in the directions y1 and y2 intersect in the vicinity of the inner surface of the lining material 3. Therefore, the water sprayed from the sprayers 31 of the coolant tube 30 is blown against the vapor mist sprayed from the sprayers 19 of the vapor tube 16, and the vapor mist and the mist-form normal-temperature water are mixed. Such a mixture enables the vapor mist to be cooled in a substantially uniformly fashion. This cooled vapor mist is blown against the inner surface of the lining material 3. This enables the thermosetting resin impregnated in the lining material 3 to be heated and cured at a suitable temperature.

In this instance, the state in which the vapor mist and the mist-form normal-temperature water are mixed can be adjusted by changing the angle α between the spraying directions y1 and y2. Therefore, for example, the angle at which the coolant tube 30 is inserted is adjusted, allowing changing the spraying direction y2 of the water and adjusting the mixing state. The cooling of the vapor mist can also be adjusted by changing the temperature of the water in the water tank 40. Therefore, a configuration may be adopted in which a thermometer for measuring the water temperature and a temperature adjustment mechanism for making adjustments to reach a predetermined temperature are provided. The temperature of the vapor mist upon hitting the inner surface of the lining material can thus be adjusted, enabling the curing temperature to be adjusted to match the curing characteristics of the lining material, and a high-quality lining can be applied to the pipeline.

In Embodiments 1, 2, and 3, the hot water 18 collects below the lining material 3. Therefore, the thermosetting resin impregnated in the lining material 3 is also uniformly heated by the hot water 18, and the lining material 3 can therefore be effectively cured.

Cool water (e.g., water that is 8 degrees or less) may also be used instead of the normal-temperature water to cool the vapor mist. In this instance, the water is cooled by actively using the cooling device 43, and the cooled water is stored in the water tank 40.

If 4 to 12 each of the sprayers 19 and 31 are provided for every meter of the vapor tube 16 and coolant tube 30, the cooled vapor mist will be uniformly blown against the inner peripheral surface of the lining material 3, uniform heating can be achieved, and the lining material can be effectively cured.

Figure 7A:
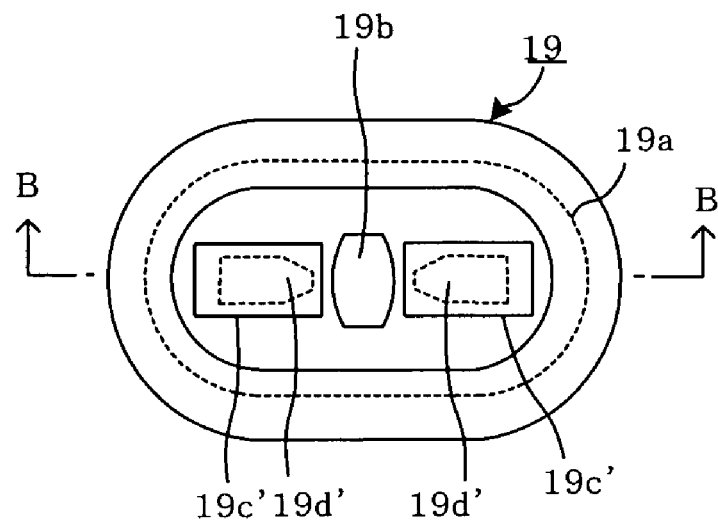
FIG. 7a is a top view showing another structure for the sprayer.
Figure 7B:
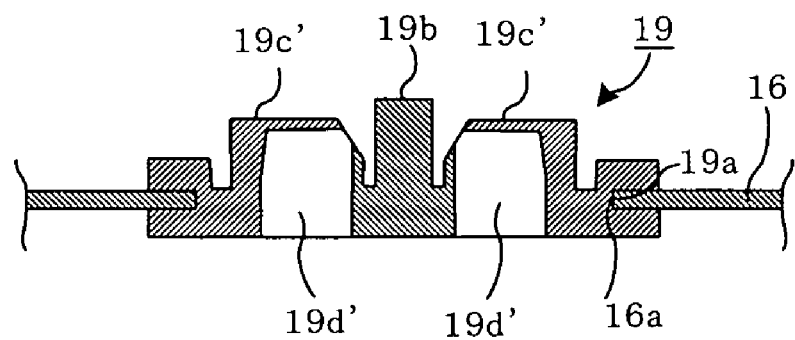

In the above-described Embodiments 1, 2, and 3, the sprayers 19 can be changed in shape as shown in FIGS. 7a and 7b. In this embodiment, square nozzles 19c' are provided in place of the circular truncated cone-shaped nozzles 19c, and the vapor is sprayed from nozzle holes 19d' that are in communication with the vapor tube. As shown by the reference symbol 19e in FIG. 8, a configuration may be adopted in which a diffusion surface 19e of the diffusing member 19b is connected continuously to the nozzle holes 19d. The sprayers 31 for spraying the normal-temperature water or cooled water can also have the configurations shown in FIGS. 7a, 7b, and 8.

Figure 8:
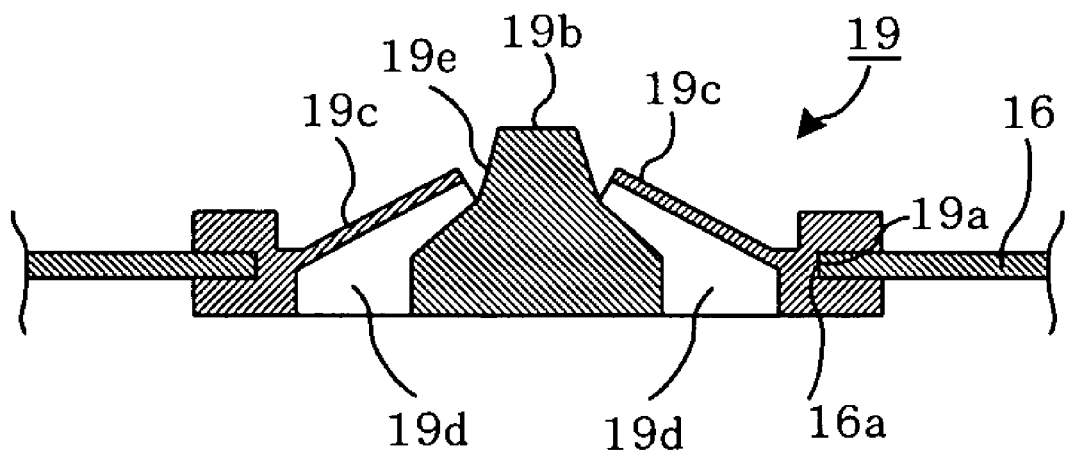
FIG. 8 is a cross-sectional view showing yet another structure for the sprayer.
Figure 9A:
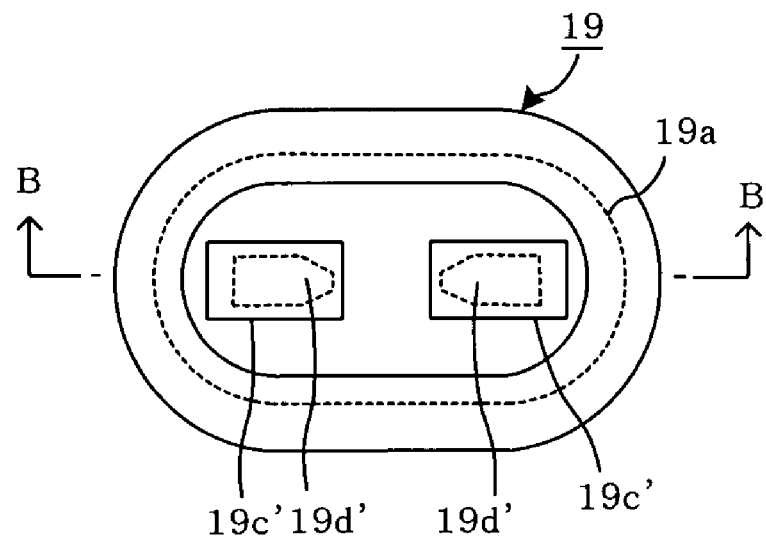
FIG. 9a is a top view showing still yet another structure for the sprayer.
Figure 9B:
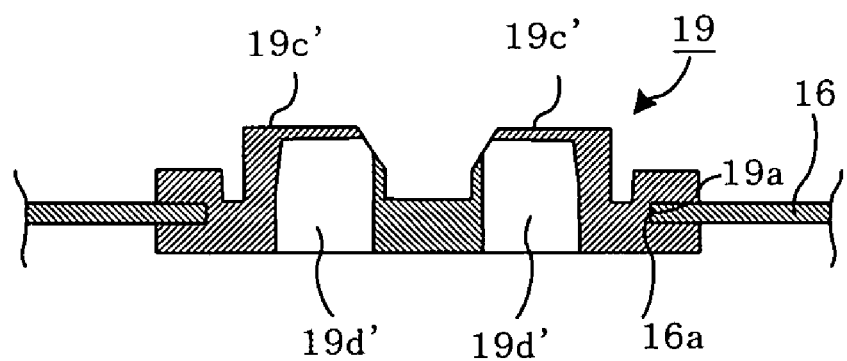
Figure 10:
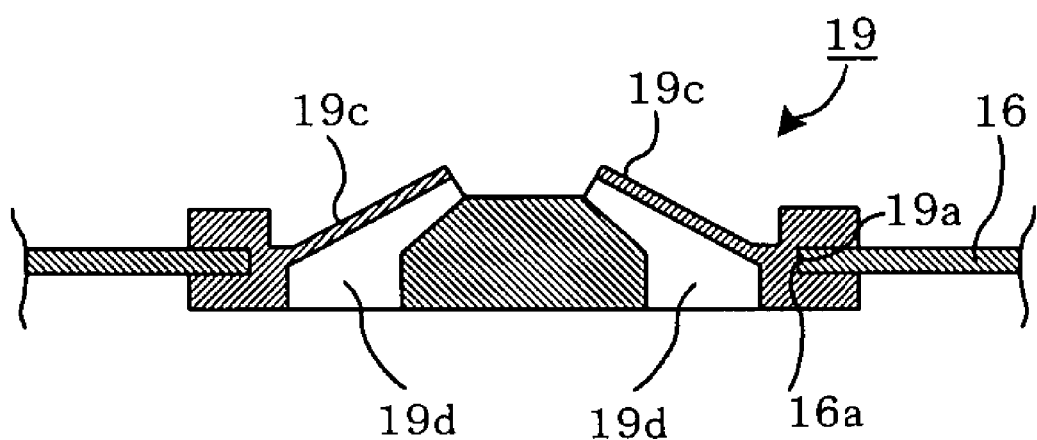
FIG. 10 is a cross-sectional view of another structure for the sprayer.

The sprayers 19 in the embodiment of FIGS. 7a and 7b can be changed in shape as shown in FIGS. 9a and 9b. The embodiment of FIG. 8 may be changed in shape as shown in FIG. 10. In other words, a structure may be adopted in which the diffusing member 19b present in the embodiments of FIGS. 7a, 7b, and 8 is omitted. In the case of the embodiment of FIGS. 9a and 9b, vapor that is pressurized and supplied to the vapor tube 16 is passed through nozzle holes 19d', which are in communication with the vapor tube 16, of facing nozzles 19c', and is sprayed from distal ends of the two nozzles 19c'. The vapor sprays come together, become a mist, and are diffused as vapor mist. The embodiment of FIG. 10 is configured in a similar manner.

The sprayers 31 for spraying the normal-temperature water or cooled water may also have a structure in which the diffusing member between the two facing nozzles is similarly omitted. In this instance, the normal-temperature water or cooled water that is pressurized and supplied to the coolant tube 30 is passed through the nozzle holes of the two facing nozzles, which nozzle holes are in communication with the coolant tube 30, and is sprayed from the distal ends of the two nozzles. The sprayed water comes together and is diffused as small water drops.

Thus, the structure of the sprayers 19 or 31 is made simpler, and the cost of manufacturing the sprayers 19 or 31 can be reduced.

The invention claimed is:

1. A pipeline lining method, comprising the steps of:
    inserting a tubular lining material impregnated with a thermosetting resin and in an everted state into a pipeline and expanding and pressing the everted tubular lining material against an inner peripheral surface of the pipeline;
    in conjunction with the insertion of the tubular lining material, inserting into the pipeline a tube provided with a plurality of spraying means for spraying a vapor mist or hot water mist, the spraying means being positioned at predetermined intervals along a lengthwise direction of the tube, each of the spraying means comprising at least one nozzle having a hole in communication with the tube and a diffusing member associated with the at least one nozzle;
    spraying from each nozzle vapor or hot water supplied thereto under pressure and, using the associated diffusing member, deflecting the sprayed vapor or hot water and diffusing the deflected vapor or hot water in the form of a vapor mist or hot water mist; and
    directing the vapor mist or the hot water mist diffused by each diffusing member onto the tubular lining material pressed against the inner peripheral surface of the pipeline to cure the thermosetting resin impregnated in the tubular lining material to line the pipeline with the tubular lining material.

2. A pipeline lining method according to claim 1; wherein for each of the spraying means, the at least one nozzle comprises a plurality of nozzles disposed in confronting relation to one another with the associated diffusing member being interposed therebetween.

3. A pipeline lining method according to claim 2; wherein for each of the spraying means, the diffusing member has curved surfaces confronting the respective nozzles.

4. A pipeline lining method, comprising the steps of:
    inserting a tubular lining material impregnated with a thermosetting resin and in an everted state into a pipeline and expanding and pressing the everted tubular lining material against an inner peripheral surface of the pipeline;
    spraying a vapor mist and cooling the sprayed vapor mist with water at normal temperature; and
    directing the cooled vapor mist onto the tubular lining material pressed against the inner peripheral surface of the pipeline to cure the thermosetting resin impregnated in the tubular lining material to line the pipeline with the tubular lining material.

5. A pipeline lining method, comprising the steps of:
    inserting a tubular lining material impregnated with a thermosetting resin and in an everted state into a pipeline and expanding and pressing the everted tubular lining material against an inner peripheral surface of the pipeline;
    spraying a vapor mist and water at normal temperature toward the tubular lining material and mixing the sprayed vapor mist with the sprayed water at normal temperature to cool the vapor mist; and
    directing the cooled vapor mist onto the tubular lining material to cure the thermosetting resin impregnated in the tubular lining material to line the pipeline with the tubular lining material.

6. A pipeline lining method according to claim 5; further comprising the step of inserting into the pipeline a tube in conjunction with the insertion of the tubular lining material, the tube being provided with a plurality of spraying means for spraying a vapor mist and positioned at predetermined intervals along a lengthwise direction of the tube; and wherein the spraying step comprises spraying the vapor mist using the plurality of spraying means.

7. A pipeline lining method according to claim 6; wherein the tube comprises a first tube; and further comprising the step of inserting into the pipeline a second tube in conjunction with the insertion of the tubular lining material, the second tube being provided with a plurality of spraying means for spraying water at normal temperature and positioned at predetermined intervals along a lengthwise direction of the second tube; and wherein the spraying step comprises spraying the water at the normal temperature using the plurality of spraying means of the second tube.

8. A pipeline lining method according to claim 5; wherein the spraying step comprises spraying the vapor mist from a plurality of spraying means provided at predetermined intervals along a lengthwise direction of a first tube, and spraying the water at normal temperature from a plurality of spraying means provided at predetermined intervals along e a length direction of a second tube disposed side-by-side to the first tube to thereby mix together the vapor mist and water at normal temperature.

9. A pipeline lining method according to claim 8; further comprising the step of providing cooling means in a water flow channel along which the water at normal temperature is circulated for cooling the water at normal temperature to suppress a temperature rise in the water at normal temperature.

10. A pipeline lining method according to claim 8; wherein the spraying step comprises adjusting an angle between a direction in which the vapor mist is sprayed toward the tubular lining material and a direction in which the water at normal temperature is sprayed toward the tubular lining material.

11. A pipeline lining method according to claim 6; wherein each spraying means of the tube comprises at least one nozzle having a hole in communication with the tube and a diffusing member; and wherein the step of spraying the vapor mist comprises spraying from the nozzle a vapor supplied to the nozzle under pressure and deflecting and diffusing the vapor sprayed from the nozzle in the form of a mist using the diffusing member.

12. A pipeline lining method according to claim 11; wherein for each of the spraying means, the at least one nozzle comprises a plurality of nozzles disposed in confronting relation to one another with the corresponding diffusing member being interposed therebetween.

13. A pipeline lining method according to claim 12; wherein for each of the spraying means, confronting surfaces of the nozzles have a curved shape, and the diffusing member has diffusion surfaces that are continuous with the respective nozzle holes.

14. A pipeline lining method according to claim 7; wherein each spraying means of the second tube comprises at least one nozzle having a hole in communication with the second tube and a diffusing member; and wherein the step of spraying the water at normal temperature comprises spraying the water at normal temperature from the nozzle of the second tube and deflecting and diffusing the sprayed water under normal temperature in the form of a mist using the diffusing member.

15. A pipeline lining method according to claim 14; wherein for each of the spraying means of the second tube, the at least one nozzle comprises a plurality of nozzles disposed in confronting relation to one another with the corresponding diffusing member being interposed therebetween.

16. A pipeline lining method according to claim 15; wherein for each of the spraying means of the second tube, confronting surfaces of the nozzles have a curved shape, and the diffusing member has diffusion surfaces that are continuous with the respective nozzle holes.

17. A pipeline lining method according to claim 1; wherein for each of the spraying means, the at least one nozzle comprises a plurality of nozzles confronting one another; and wherein the spraying step comprises spraying from each of the confronting nozzles the vapor or hot water so that the diffusing member causes the vapor or hot water sprayed from the nozzles to bump together and diffuse in the form of the vapor mist or hot water mist.

18. A pipeline lining method according to claim 6; wherein each of the spraying means comprises a plurality of nozzles that confront one another, each of the nozzles having a hole in communication with the tube for spraying vapor supplied thereto under pressure; and wherein the spraying step comprises spraying vapor from each of the confronting nozzles so as to cause the vapor sprayed from the nozzles to bump together and diffuse in the form of a the vapor mist.

19. A pipeline lining method according to claim 7; wherein each of the spraying means of the second tube has a plurality of nozzles that confront one another, each of the nozzles having a hole in communication with the second tube for spraying water at normal temperature supplied thereto under pressure; and wherein the spraying step comprises spraying the water at normal temperature under pressure from each of the confronting nozzles so as to cause the water at normal temperature sprayed from the nozzles to bump together and diffuse in the form of a mist.

20. A pipeline lining method according to claim 4; further comprising the step of inserting into the pipeline a tube in conjunction with the insertion of the tubular lining material, the tube being provided with a plurality of spraying means for spraying a vapor mist and positioned at predetermined intervals along a lengthwise direction of the tube; and wherein the spraying step comprises spraying the vapor mist using the plurality of spraying means.

21. A pipeline lining method, comprising the steps of:
inserting a tubular lining material impregnated with a thermosetting resin and in an everted state into a pipeline and expanding and pressing the everted tubular lining material against an inner peripheral surface of the pipeline;
inserting into the pipeline a tube in conjunction with the insertion of the tubular lining material, the tube being provided with a plurality of spraying means for spraying a vapor mist and positioned at predetermined intervals along a lengthwise direction of the tube;
spraying a vapor mist using the plurality of spraying means and cooling the sprayed vapor mist; and
directing the cooled vapor mist onto the tubular lining material pressed against the inner peripheral surface of the pipeline to cure the thermosetting resin impregnated in the tubular lining material to line the pipeline with the tubular lining material.

22. A pipeline lining method, comprising the steps of:
inserting a tubular lining material impregnated with a thermosetting resin and in an everted state into a pipeline and expanding and pressing the everted tubular lining material against an inner peripheral surface of the pipeline;
inserting into the pipeline a tube in conjunction with the insertion of the tubular lining material, the tube being provided with a plurality of spraying means for spraying water at normal temperature and positioned at predetermined intervals along a lengthwise direction of the tube;
spraying a vapor mist toward the lining material;
spraying water at normal temperature toward the tubular lining material using the plurality of spraying means and mixing the sprayed water at normal temperature with the sprayed vapor mist to cool the vapor mist; and
directing the cooled vapor mist onto the tubular lining material to cure the thermosetting resin impregnated in the tubular lining material to line the pipeline with the tubular lining material.

23. A pipeline lining method, comprising the steps of:
inserting a tubular lining material impregnated with a thermosetting resin and in an everted state into a pipeline and expanding and pressing the everted tubular lining material against an inner peripheral surface of the pipeline;
providing cooling means in a water flow channel along which water at normal temperature is circulated;
spraying a vapor mist toward the tubular lining material;
spraying from the water flow channel water at normal temperature toward the tubular lining material and mixing the sprayed water at normal temperature with the sprayed vapor mist to cool the vapor mist and while cooling the water at normal temperature using the cooling means to suppress a temperature rise in the sprayed water at normal temperature; and
directing the cooled vapor mist onto the tubular lining material to cure the thermosetting resin impregnated in the tubular lining material to line the pipeline with the tubular lining material.

24. A pipeline lining method, comprising the steps of:
inserting a tubular lining material impregnated with a thermosetting resin and in an everted state into a pipeline and expanding and pressing the everted tubular lining material against an inner peripheral surface of the pipeline;
in conjunction with the insertion of the tubular lining material, inserting into the pipeline a tube provided with a plurality of spraying means for spraying a vapor mist or hot water mist, each of the spraying means comprising a plurality of nozzles confronting one another;
spraying from each of the confronting nozzles vapor or hot water supplied thereto under pressure so as to cause the vapor or hot water sprayed from the confronting nozzles to bump together and diffuse in the form of a vapor mist or hot water mist; and
directing the diffused vapor mist or hot water mist onto the tubular lining material pressed against the inner peripheral surface of the pipeline to cure the thermosetting resin impregnated in the tubular lining material to line the pipeline with the tubular lining material.

* * * * *